United States Patent
Dimitriadis (10) Patent No.: US 10,140,459 B2
(45) Date of Patent: Nov. 27, 2018

(54) ELECTRONIC SYSTEMS OF ELECTRONIC TERMINALS AND SERVERS FOR SECURING INFORMATION INTEGRITY IN THE DISTRIBUTED TECHNOLOGICAL ENVIRONMENT AND METHODS OF USING THEREOF

(71) Applicant: Intralot S.A.—Integrated Lottery Systems and Services, Athens (GR)

(72) Inventor: Christos Dimitriadis, Athens (GR)

(73) Assignee: Intralot S.A.—Integrated Lottery Systems and Services, Athens (GR)

( * ) Notice: Subject to any disclaimer, the term of this patent is extended or adjusted under 35 U.S.C. 154(b) by 264 days.

(21) Appl. No.: 14/876,321

(22) Filed: Oct. 6, 2015

(65) Prior Publication Data

US 2016/0098575 A1    Apr. 7, 2016

Related U.S. Application Data (60) Provisional application No. 62/060,425, filed on Oct. 6, 2014.

(51) Int. Cl.
*H04L 29/06* (2006.01)
*G06F 21/62* (2013.01)
(Continued)

(52) U.S. Cl.
CPC ..... *G06F 21/6218* (2013.01); *G06Q 20/0453* (2013.01); *G06Q 20/06* (2013.01);
(Continued)

(58) Field of Classification Search
CPC ... G06C 20/3674; G06C 20/382; G07F 17/32; G07F 17/329
See application file for complete search history.

(56) References Cited

U.S. PATENT DOCUMENTS

| | | | |
|---|---|---|---|
| 6,500,067 | B1 | 12/2002 | Luciano et al. |
| 2007/0021191 | A1 | 1/2007 | White et al. |

(Continued)

FOREIGN PATENT DOCUMENTS

| | | |
|---|---|---|
| WO | 2002/022223 A2 | 3/2002 |
| WO | 2006/059129 A1 | 6/2006 |

OTHER PUBLICATIONS

International Search Report and Written Opinion from International Application No. PCT/IB2015/002098 dated Mar. 9, 2016.

*Primary Examiner* — Tri Tran
(74) *Attorney, Agent, or Firm* — Greenberg Traurig, LLP (57) ABSTRACT

In some embodiments, the present invention provides for a computer-implemented method, including: electronically receiving, first terminal data where the first terminal data includes at least one first alphanumerical data sequence; electronically generating at least one first computer-generated barcode; electronically storing the first terminal data and the at least one first computer-generated barcode in at least one database residing in a non-transient computer memory; automatically and electronically transmitting the at least one first computer-generated barcode to the at least one first terminal machine; electronically receiving second terminal data; automatically validating, in real-time, the user input as being representative of the user output.

22 Claims, 7 Drawing Sheets

(51) Int. Cl.
*G06Q 20/04* (2012.01)
*G06Q 20/06* (2012.01)

(52) U.S. Cl.
CPC .............. H04L 63/10 (2013.01); H04L 63/12 (2013.01); *H04L 2463/102* (2013.01)

(56) References Cited

U.S. PATENT DOCUMENTS

| | | |
|---|---|---|
| 2009/0117997 A1 | 5/2009 | Oram et al. |
| 2012/0231867 A1* | 9/2012 | Dimitriadis ............. G07F 17/32 463/19 |
| 2014/0141866 A1* | 5/2014 | Irwin, Jr. ............ G07F 17/3244 463/25 |

* cited by examiner

ELECTRONIC SYSTEMS OF ELECTRONIC TERMINALS AND SERVERS FOR SECURING INFORMATION INTEGRITY IN THE DISTRIBUTED TECHNOLOGICAL ENVIRONMENT AND METHODS OF USING THEREOF

RELATED APPLICATIONS

This application claims the priority of U.S. provisional Patent application No. 62/060,425; filed Oct. 6, 2014; entitled "ELECTRONIC SYSTEMS OF ELECTRONIC TERMINALS AND SERVERS FOR SECURING INFORMATION INTEGRITY IN THE DISTRIBUTED TECHNOLOGICAL ENVIRONMENT AND METHOD OF USING THEREOF," which is incorporated herein by reference in its entirety for all purposes.

TECHNICAL FIELD

In some embodiments, the instant invention is related to computer methods/systems for improving computer data integrity and validation.

BACKGROUND

In computer science and electrical engineering, data security technologies are methods of protecting data, such as a database, from destructive forces and from the unwanted actions of unauthorized users.

SUMMARY OF INVENTION

In some embodiments, the present invention provides for a computer-implemented method, including: electronically receiving, at a first time, via a first computer network, by at least one specifically programmed computer processor of a central data management system executing software to perform the method, first terminal data where the first terminal data includes at least one first alphanumerical data sequence, where the at least one first alphanumerical data sequence has been generated by at least one first terminal machine and is a result of at least one first one-way hashing algorithm whose at least one first input is at least one first terminal-generated number which has been generated by or has been entered into the at least one first terminal machine; electronically generating, by the at least one specifically programmed computer processor of the central data management system, at least one first computer-generated barcode based, at least in part, on the first terminal data; electronically storing, in real-time, by the at least one specifically programmed computer processor of the central data management system, the first terminal data and the at least one first computer-generated barcode in at least one database residing in a non-transient computer memory; automatically and electronically transmitting, in real-time, by the at least one specifically programmed computer processor of the central data management system, the at least one first computer-generated barcode to the at least one first terminal machine; where the at least one first terminal machine is configured to generate a user output, including: i) the at least one first terminal-generated number, and ii) the at least one first computer-generated barcode; electronically receiving, at a second time, via a second computer network, by the at least one specifically programmed computer processor of the central data management system, second terminal data where the second terminal data includes: i) at least one second alphanumerical data sequence, ii) at least one second computer-generated barcode; where the at least one second alphanumerical data sequence has been generated by the at least one second terminal machine and is a result of the at least one first one-way hashing algorithm whose at least one second input is at least one second terminal-generated number which has been acquired by the at least one second terminal machine from a user input which is being offered as being representative of the user output; automatically validating, in real-time, by the at least one specifically programmed computer processor of the central data management system, the user input as being representative of the user output by performing one of: i) confirming that: 1) the at least one second alphanumerical data sequence equals to the at least one second first alphanumerical data sequence, and 2) the at least one second computer-generated barcode matches to the at least one first computer-generated barcode; or ii) generating a validation error when: 1) the at least one second alphanumerical data sequence does not equal to the at least one first alphanumerical data sequence, or 2) the at least one second computer-generated barcode does not match to the at least one first computer-generated barcode; and automatically and electronically transmitting, in real-time, by the at least one specifically programmed computer processor of the central data management system, a validation notification to the at least one second terminal machine, where the validation notification identifies that: i) the user input has been validated to be representative of the user output, or ii) the user input is not representative of the user output. In some embodiments, the at least one first one-way hashing algorithm is selected from the group consisting of: SHA-224, SHA-256, SHA-384, SHA-512, SHA-512/224, SHA-512/256, RIPEMD-128/256, RIPEMD-320, SHA-3, SHA3-224, SHA3-256, SHA3-384, and SHA3-512. In some embodiments, the first terminal data further includes: play data about at least one game being played by at least one participant. In some embodiments, the at least one game is a lottery game. In some embodiments, the at least one computer-generated barcode include at least one of: i) a predetermine number of alphanumerical characters, ii) visual data representative of at least one visual imagery, iii) audio data representative of at least one audio recording; and iv) any combination thereof. In some embodiments, the at least one visual imagery is an optical machine-readable representation including a plurality of geometric shapes. In some embodiments, the plurality of geometric shapes include a plurality of parallel lines, having varying widths, spacings, or both. In some embodiments, the output is a paper ticket. In some embodiments, the output is a computer-generated display presentation caused, by the at least one specifically programmed computer processor of the central data management system, to be generated of on at least one of: i) a screen of the at least one first terminal machine, and ii) a screen of at least one computing device which is distinct from the at least one first terminal machine. In some embodiments, the at least one computing device is a mobile device of a user. In some embodiments, the first computer network and the second computer network are the same. In some embodiments, the at least one first terminal machine and the at least one second terminal machine are the same.

In some embodiments, the present invention provides for a specifically programmed central data management system, including: at least one specialized computer machine, including: a non-transient memory, electronically storing particular computer executable program code; and at least one computer processor which, when executing the particular program code, becomes a specifically programmed computer processor of the specifically programmed central data management system that is configured to at least perform the following operations: electronically receiving, at a first time, via a first computer network, first terminal data where the first terminal data includes at least one first alphanumerical data sequence, where the at least one first alphanumerical data sequence has been generated by at least one first terminal machine and is a result of at least one first one-way hashing algorithm whose at least one first input is at least one first terminal-generated number which has been generated by or has been entered into the at least one first terminal machine; electronically generating at least one first computer-generated barcode based, at least in part, on the first terminal data; electronically storing, in real-time, the first terminal data and the at least one first computer-generated barcode in at least one database residing in a non-transient computer memory; automatically and electronically transmitting, in real-time, the at least one first computer-generated barcode to the at least one first terminal machine; where the at least one first terminal machine is configured to generate a user output, including: i) the at least one first terminal-generated number, and ii) the at least one first computer-generated barcode; electronically receiving, at a second time, via a second computer network, second terminal data where the second terminal data includes: i) at least one second alphanumerical data sequence, ii) at least one second computer-generated barcode; where the at least one second alphanumerical data sequence has been generated by the at least one second terminal machine and is a result of the at least one first one-way hashing algorithm whose at least one second input is at least one second terminal-generated number which has been acquired by the at least one second terminal machine from a user input which is being offered as being representative of the user output, automatically validating, in real-time, the user input as being representative of the user output by performing one of: i) confirming that: 1) the at least one second alphanumerical data sequence equals to the at least one first alphanumerical data sequence, and 2) the at least one second computer-generated barcode matches to the at least one first computer-generated barcode; or ii) generating a validation error when: 1) the at least one second alphanumerical data sequence does not equal to the at least one first alphanumerical data sequence, or 2) the at least one second computer-generated barcode does not match to the at least one first computer-generated barcode; and automatically and electronically transmitting, in real-time, a validation notification to the at least one second terminal machine, where the validation notification identifies that: i) the user input has been validated to be representative of the user output, or ii) the user input is not representative of the user output. In some embodiments, the at least one first one-way hashing algorithm is selected from the group consisting of: SHA-224, SHA-256, SHA-384, SHA-512, SHA-512/224, SHA-512/256, RIPEMD-128/256, RIPEMD-320, SHA-3, SHA3-224, SHA3-256, SHA3-384, and SHA3-512. In some embodiments, the first terminal data further includes: play data about at least one game being played by at least one participant. In some embodiments, the at least one game is a lottery game. In some embodiments, the at least one computer-generated barcode includes at least one of: i) a predetermined number of alphanumerical characters, ii) visual data representative of at least one visual imagery, iii) audio data representative of at least one audio recording; and iv) any combination thereof. In some embodiments, the at least one visual imagery is an optical machine-readable representation including a plurality of geometric shapes. In some embodiments, the plurality of geometric shapes include a plurality of parallel lines, having varying widths, spacings, or both. In some embodiments, the output is a paper ticket. In some embodiments, the output is a computer-generated display presentation caused, by the at least one specifically programmed computer processor of the central data management system, to be generated of on at least one of: i) a screen of the at least one first terminal machine, and ii) a screen of at least one computing device which is distinct from the at least one first terminal machine. In some embodiments, the at least one computing device is a mobile device of a user. In some embodiments, the first computer network and the second computer network are the same. In some embodiments, the at least one first terminal machine and the at least one second terminal machine are the same.

BRIEF DESCRIPTION OF DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DESCRIPTION OF EXEMPLARY EMBODIMENTS

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, each inventive electronic terminal can be any purpose terminal that transacts with individuals (e.g., a lottery terminal, a gaming terminal, a vending machine, an individual's mobile device being programmed to serve, as, for example, lottery and/or gaming terminal, etc.).

In some embodiments, the inventive electronic systems of electronic terminals (e.g., lottery and/or gaming terminals) and servers for securing information in the distributed technological environment in accordance with the instant invention can be configured to deliver at least one registered ticket and/or its electronic presentation to a user (e.g., a visual image on a screen of a user's mobile device). In some embodiments, the inventive electronic system(s) of instant invention include(s) a plurality of inventive electronic terminals (e.g., lottery and/or gaming terminals) and at least one central server, communicating over a suitable data communication network (e.g., the Internet, etc.) and utilizing at least one suitable data communication protocol (e.g., IPX/SPX, X.25, AX.25, AppleTalk, TCP/IP (e.g., HTTP), etc.).

In some embodiments, the terminal(s) (e.g., lottery and/or gaming terminals) in accordance with the instant invention are configured (e.g., specifically programmed) to generate at least one number (T). In some embodiments, the T number can include a predetermined number of digits. In some embodiments, the inventive electronic terminal(s) can generate an alpha-numeric sequence (I) by using a function of T (i.e., I=f{T}). In some embodiments, the inventive terminal(s) can generate I by using at least one one-way hashing algorithm utilizing T as input. In some embodiments, an one-way hash algorithm is selected from the group of the following hashing algorithms: SHA-224, SHA-256, SHA-384, SHA-512, SHA-512/224, SHA-512/256, RIPEMD-128/256, RIPEMD-320, SHA-3, SHA3-224, SHA3-256, SHA3-384, and SHA3-512.

In some embodiments, the inventive system(s) can deliver I and/or play information (PI) to inventive central server(s) of the instant invention. In some embodiments, after the inventive central server(s) receive(s) I and/or PI, the inventive central server(s) can generate a barcode (B), where B can be stored in a database operatively associated with the inventive central server(s). In some embodiments, B can include a visual imagery and/or a predetermined number digits. In some embodiments, the inventive central server(s) of the inventive electronic system(s) store(s) B, PI, I, or any combination thereof. In some embodiments, the inventive central server(s) of the inventive electronic system(s) can deliver B to the inventive terminal(s). In some embodiments, after the inventive terminal(s) receive(s) B, the inventive terminal(s) are configured to print T and/or B on a ticket, where the ticket can be delivered to a user.

Figure 5:
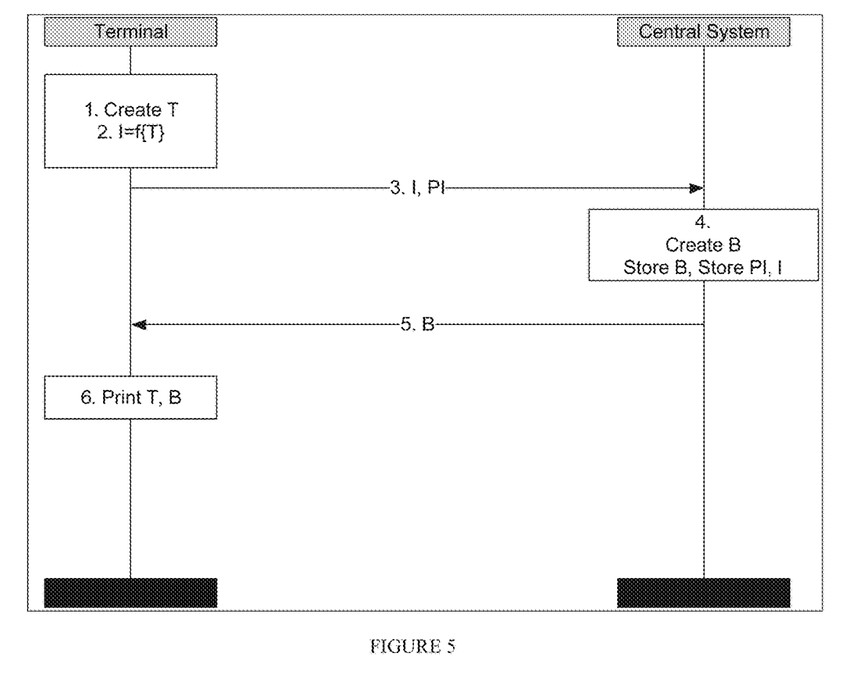
FIG. 5 illustrates some embodiments of the system of the present invention, showing an exemplary data integrity protection protocol of the present invention.

FIG. 5 shows an embodiment of a ticket registration of the present invention.

Illustrative Authentication/Verification

In some embodiments, an inventive electronic system of the instant invention is configured to authenticate/verify each ticket received from a user, a retailer, or any other entity in possession of such ticket and/or its visual presentation. In some embodiments, an exemplary inventive terminal is configured to receive at least one input (e.g., receive a scan and/or receive a typed input), where the at least one input can be B and/or T. In some embodiments, B and/or T can be visually read by the exemplary inventive terminal. In some embodiments, the exemplary inventive terminal is configured to generate an alpha-numeric sequence (I') by using a function of T (i.e., I'=f{T}). In some embodiments, the exemplary inventive terminal generates I' by using the one-way hashing algorithm, utilizing T as input. In some embodiments, the inventive terminal(s) deliver(s) B and/or I' to a central server(s). In some embodiments, the inventive central server(s) is/are configured to authenticate/verify a ticket(s) when (1) the B is validated and (2) I', as sent by the inventive terminal, is identical to I as stored in the database associated with the inventive central server(s). In some embodiments, the inventive server(s) is/are configured to reject a ticket when (1) the B is not validated and/or (2) I', as sent by the terminal, is not identical to I as stored in the central system. In some embodiments, the inventive electronic system(s) can be configured to notify a user, a retailer, or any other entity in possession of a ticket about ticket status (e.g., if the ticket is valid or is not valid).

Figure 6:
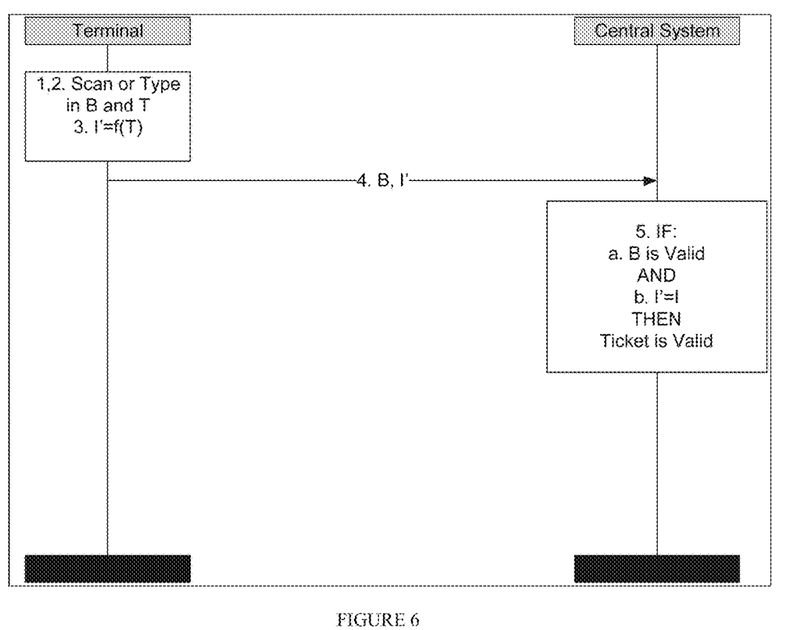
FIG. 6 illustrates some embodiments of the system of the present invention, showing an exemplary data integrity validation protocol of the present invention.

FIG. 6 shows an embodiment of a ticket validation of the present invention.

Figure 7:
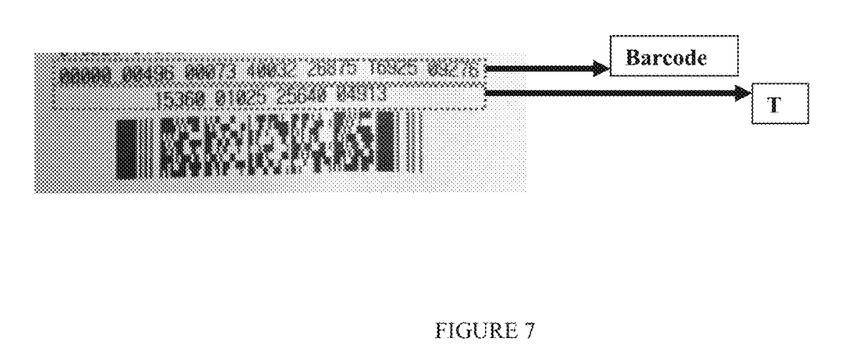
FIG. 7 illustrates an embodiment of the system of the present invention, showing a ticket having certain values and imagery in accordance with the present invention.

FIG. 7 illustrates an embodiment of a ticket having B and T values/images in accordance with the present invention.

In some embodiments, B is an optical machine-readable representation (e.g., PDF417 or QR bar code) of data relating to the ticket. In some embodiments, B can be generated by an algorithm, where the algorithm produces a unique result by correlating (e.g., utilizing as inputs game play and/or ticket data). In some embodiments, game play and/or ticket data can include game family data, game type data, game event data, drawn number, play time data, a play date, retailer information, play data (e.g., prognostics), any other suitable information regarding the game, or any combination thereof. In some embodiments, PI can include game play and/or ticket data.

In some embodiments, the inventive electronic system(s) utilize(s) specifically programmed graphical user interface(s) (GUI) for allowing a user to set/control suitable operating parameters. In some embodiments, the inventive system(s) include(s) a GUI, where the GUI is configured to (1) allow a user to input data and (2) deliver data to a user. In some embodiments, the data delivered to the user includes ticket registration and/or ticket validation. In some embodiments, the input data set utilizing GUI can include controlling parameters, including, e.g., visual parameters and parameters relating to configuring the system to process and/or deliver data.

Illustrative Operating Environments

Figure 1:
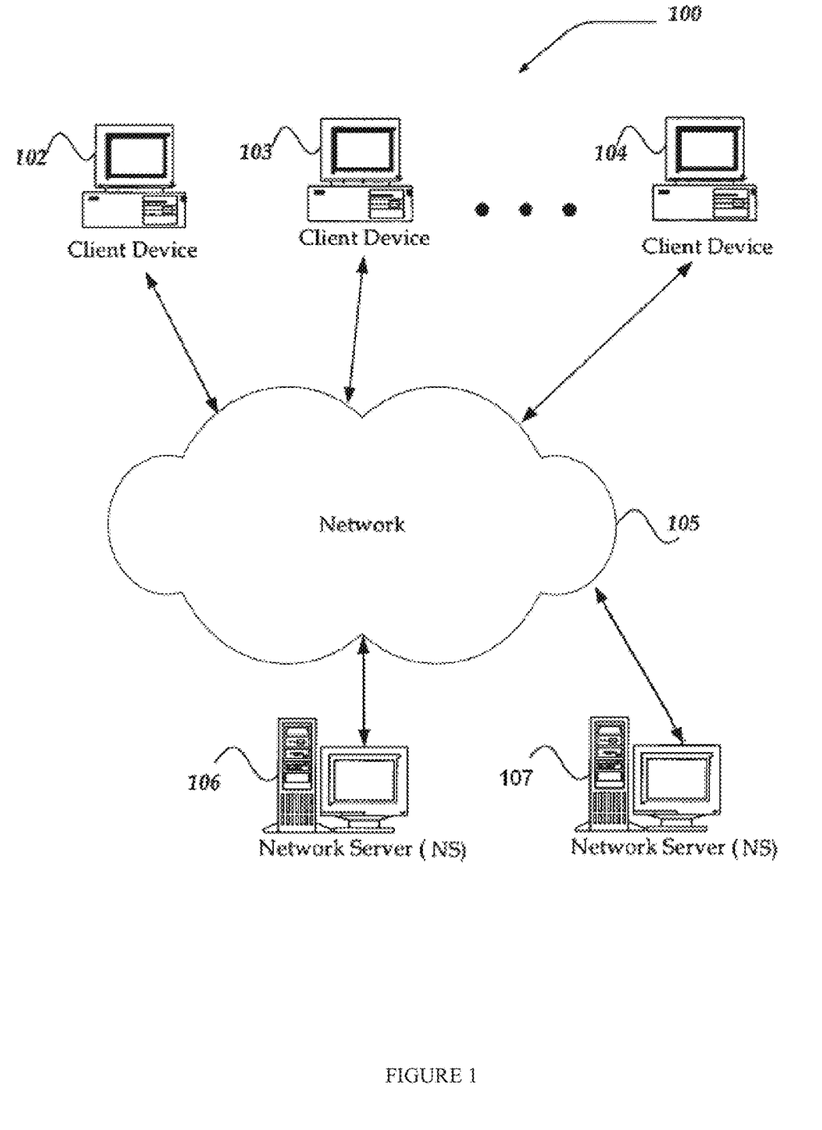
FIG. 1 illustrates some embodiments of the system of the present invention, showing network servers communicating with client devices by use of a network.

FIG. 1 illustrates one embodiment of an environment in which the present invention may operate. However, not all of these components may be required to practice the invention, and variations in the arrangement and type of the components may be made without departing from the spirit or scope of the invention. In some embodiments, the inventive system and method may include a large number of members and/or concurrent transactions. In other embodiments, the inventive system and method are based on a scalable computer and network architecture that incorporates varies strategies for assessing the data, caching, searching, and database connection pooling. An example of the scalable architecture is an architecture that is capable of operating multiple servers.

In embodiments, members of the computer system 102-104 include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In embodiments, programming may include either Java, .Net, QT, C, C++ or other suitable programming language.

In embodiments, member devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like or a Proprietary protocol.

In embodiments, network 105 may be configured to couple one computing device to another computing device to enable them to communicate. In some embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
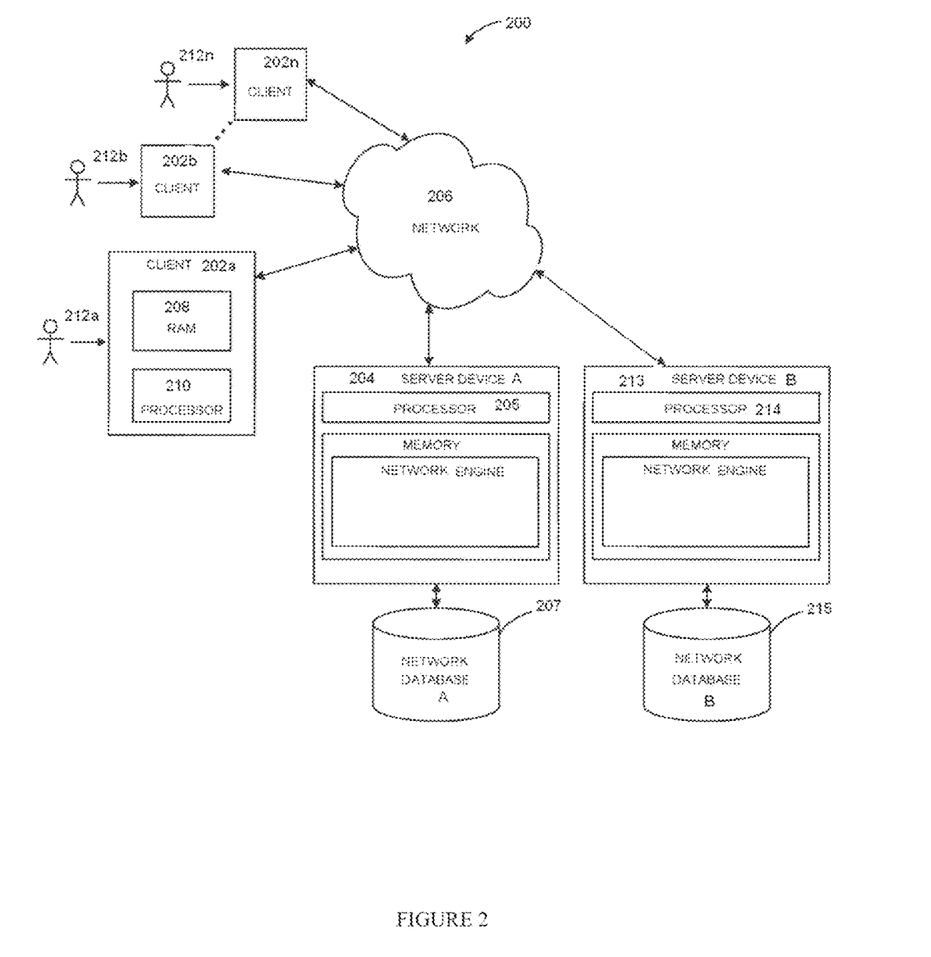
FIG. 2 illustrates some embodiments of the system of the present invention, showing a computer and network architecture that supports the inventive system.

FIG. 2 shows another exemplary embodiment of the computer and network architecture that supports the methods and systems of the instant invention. In some embodiments, the member devices 202a, 202b thru 202n shown each at least includes a computer-readable medium, such as a random access memory (RAM) 208 coupled to a processor 210 or FLASH memory. In some embodiments, the processor 210 may execute computer-executable program instructions stored in memory 208. In some embodiments, such processors include a microprocessor, an ASIC, and state machines. In some embodiments, such processors include, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, and JavaScript.

In some embodiments, member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a may be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera. Through the client devices 202a-n, users, 212a-n communicate over the network 206 with each other and with other systems and devices coupled to the network 206. As shown in FIG. 2, server devices 204 and 213 may be also coupled to the network 206. In an embodiment of the present invention, one or more clients can be a mobile client.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, near-field wireless communication (NFC) can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

Figure 3:
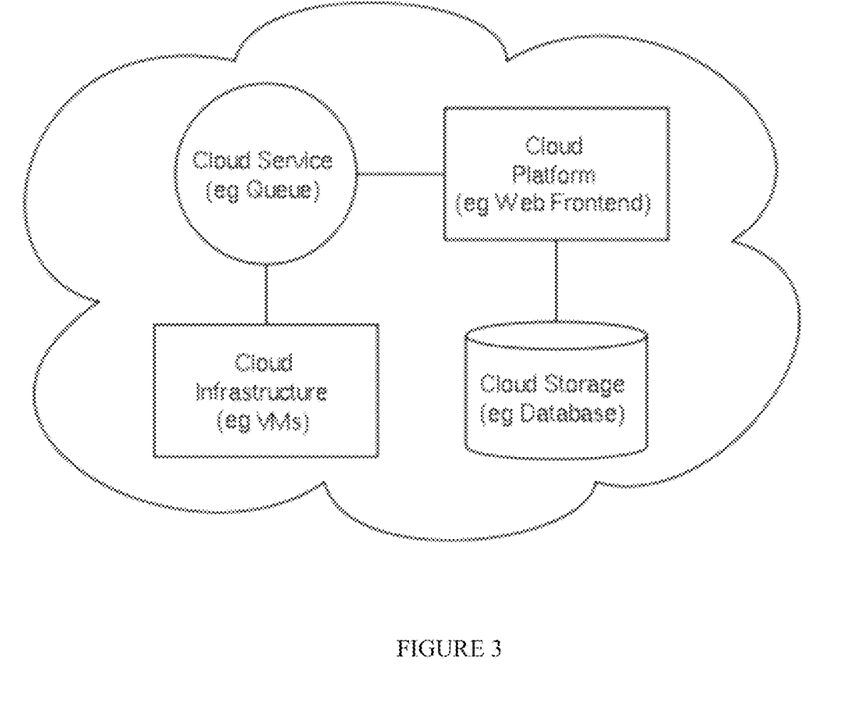
FIG. 3 illustrates some embodiments of the system of the present invention, showing a cloud system supporting the inventive system.
Figure 4:
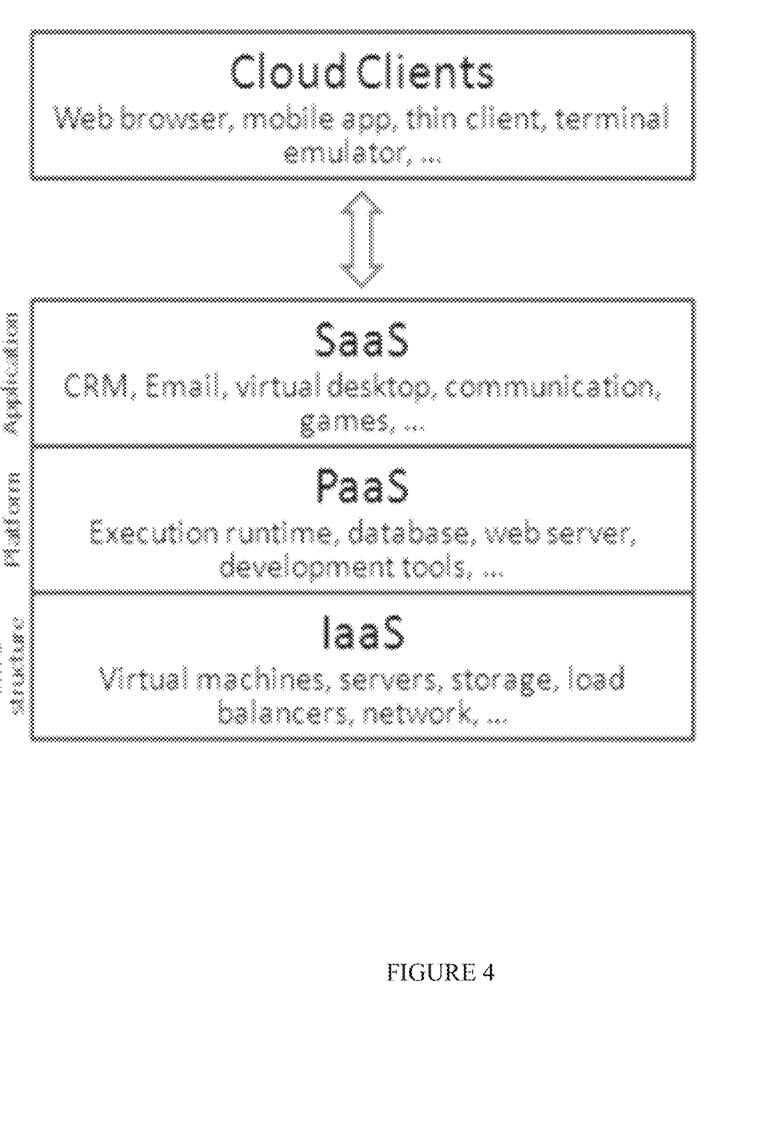
FIG. 4 illustrates some embodiments of the system of the present invention, showing the cloud systems supporting the inventive system and allowing a delivering and receiving of information to and/or from cloud clients.

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the instant invention offers/manages the cloud computing/architecture as, but not limiting to: infrastructure a service (IaaS), platform as a service (PaaS), and software as a service (SaaS). FIGS. 3 and 4 illustrate schematics of exemplary implementations of the cloud computing/architecture.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, the present invention provides for a computer-implemented method, including: electronically receiving, at a first time, via a first computer network, by at least one specifically programmed computer processor of a central data management system executing software to perform the method, first terminal data where the first terminal data includes at least one first alphanumerical data sequence, where the at least one first alphanumerical data sequence has been generated by at least one first terminal machine and is a result of at least one first one-way hashing algorithm whose at least one first input is at least one first terminal-generated number which has been generated by or has been entered into the at least one first terminal machine; electronically generating, by the at least one specifically programmed computer processor of the central data management system, at least one first computer-generated barcode based, at least in part, on the first terminal data; electronically storing, in real-time, by the at least one specifically programmed computer processor of the central data management system, the first terminal data and the at least one first computer-generated barcode in at least one database residing in a non-transient computer memory; automatically and electronically transmitting, in real-time, by the at least one specifically programmed computer processor of the central data management system, the at least one first computer-generated barcode to the at least one first terminal machine; where the at least one first terminal machine is configured to generate a user output, including: i) the at least one first terminal-generated number, and ii) the at least one first computer-generated barcode; electronically receiving, at a second time, via a second computer network, by the at least one specifically programmed computer processor of the central data management system, second terminal data where the second terminal data includes: i) at least one second alphanumerical data sequence, ii) at least one second computer-generated barcode; where the at least one second alphanumerical data sequence has been generated by the at least one second terminal machine and is a result of the at least one first one-way hashing algorithm whose at least one second input is at least one second terminal-generated number which has been acquired by the at least one second terminal machine from a user input which is being offered as being representative of the user output; automatically validating, in real-time, by the at least one specifically programmed computer processor of the central data management system, the user input as being representative of the user output by performing one of: i) confirming that: 1) the at least one second alphanumerical data sequence equals to the at least one first alphanumerical data sequence, and 2) the at least one second computer-generated barcode matches to the at least one first computer-generated barcode; or ii) generating a validation error when: 1) the at least one second alphanumerical data sequence does not equal to the at least one first alphanumerical data sequence, or 2) the at least one second computer-generated barcode does not match to the at least one first computer-generated barcode; and automatically and electronically transmitting, in real-time, by the at least one specifically programmed computer processor of the central data management system, a validation notification to the at least one second terminal machine, where the validation notification identifies that: i) the user input has been validated to be representative of the user output, or ii) the user input is not representative of the user output. In some embodiments, the at least one first one-way hashing algorithm is selected from the group consisting of: SHA-224, SHA-256, SHA-384, SHA-512, SHA-512/224, SHA-512/256, RIPEMD-128/256, RIPEMD-320, SHA-3, SHA3-224, SHA3-256, SHA3-384, and SHA3-512. In some embodiments, the first terminal data further includes: play data about at least one game being played by at least one participant. In some embodiments, the at least one game is a lottery game. In some embodiments, the at least one computer-generated barcode include at least one of: i) a predetermine number of alphanumerical characters, ii) visual data representative of at least one visual imagery, iii) audio data representative of at least one audio recording; and iv) any combination thereof. In some embodiments, the at least one visual imagery is an optical machine-readable representation including a plurality of geometric shapes. In some embodiments, the plurality of geometric shapes include a plurality of parallel lines, having varying widths, spacings, or both. In some embodiments, the output is a paper ticket. In some embodiments, the output is a computer-generated display presentation caused, by the at least one specifically programmed computer processor of the central data management system, to be generated of on at least one of: i) a screen of the at least one first terminal machine, and ii) a screen of at least one computing device which is distinct from the at least one first terminal machine. In some embodiments, the at least one computing device is a mobile device of a user. In some embodiments, the first computer network and the second computer network are the same. In some embodiments, the at least one first terminal machine and the at least one second terminal machine are the same.

In some embodiments, the present invention provides for a specifically programmed central data management system, including: at least one specialized computer machine, including: a non-transient memory, electronically storing particular computer executable program code; and at least one computer processor which, when executing the particular program code, becomes a specifically programmed computer processor of the specifically programmed central data management system that is configured to at least perform the following operations: electronically receiving, at a first time, via a first computer network, first terminal data where the first terminal data includes at least one first alphanumerical data sequence, where the at least one first alphanumerical data sequence has been generated by at least one first terminal machine and is a result of at least one first one-way hashing algorithm whose at least one first input is at least one first terminal-generated number which has been generated by or has been entered into the at least one first terminal machine; electronically generating at least one first computer-generated barcode based, at least in part, on the first terminal data; electronically storing, in real-time, the first terminal data and the at least one first computer-generated barcode in at least one database residing in a non-transient computer memory; automatically and electronically transmitting, in real-time, the at least one first computer-generated barcode to the at least one first terminal machine; where the at least one first terminal machine is configured to generate a user output, including: i) the at least one first terminal-generated number, and ii) the at least one first computer-generated barcode; electronically receiving, at a second time, via a second computer network, second terminal data where the second terminal data includes: i) at least one second alphanumerical data sequence, ii) at least one second computer-generated barcode; where the at least one second alphanumerical data sequence has been generated by the at least one second terminal machine and is a result of the at least one first one-way hashing algorithm whose at least one second input is at least one second terminal-generated number which has been acquired by the at least one second terminal machine from a user input which is being offered as being representative of the user output, automatically validating, in real-time, the user input as being representative of the user output by performing one of: i) confirming that: 1) the at least one second alphanumerical data sequence equals to the at least one first alphanumerical data sequence, and 2) the at least one second computer-generated barcode matches to the at least one first computer-generated barcode; or ii) generating a validation error when: 1) the at least one second alphanumerical data sequence does not equal to the at least one first alphanumerical data sequence, or 2) the at least one second computer-generated barcode does not match to the at least one first computer-generated barcode; and automatically and electronically transmitting, in real-time, a validation notification to the at least one second terminal machine, where the validation notification identifies that: i) the user input has been validated to be representative of the user output, or ii) the user input is not representative of the user output. In some embodiments, the at least one first one-way hashing algorithm is selected from the group consisting of: SHA-224, SHA-256, SHA-384, SHA-512, SHA-512/224, SHA-512/256, RIPEMD-128/256, RIPEMD-320, SHA-3, SHA3-224, SHA3-256, SHA3-384, and SHA3-512. In some embodiments, the first terminal data further includes: play data about at least one game being played by at least one participant. In some embodiments, the at least one game is a lottery game. In some embodiments, the at least one computer-generated barcode includes at least one of: i) a predetermined number of alphanumerical characters, ii) visual data representative of at least one visual imagery, iii) audio data representative of at least one audio recording; and iv) any combination thereof. In some embodiments, the at least one visual imagery is an optical machine-readable representation including a plurality of geometric shapes. In some embodiments, the plurality of geometric shapes include a plurality of parallel lines, having varying widths, spacings, or both. In some embodiments, the output is a paper ticket. In some embodiments, the output is a computer-generated display presentation caused, by the at least one specifically programmed computer processor of the central data management system, to be generated of on at least one of: i) a screen of the at least one first terminal machine, and ii) a screen of at least one computing device which is distinct from the at least one first terminal machine. In some embodiments, the at least one computing device is a mobile device of a user. In some embodiments, the first computer network and the second computer network are the same. In some embodiments, the at least one first terminal machine and the at least one second terminal machine are the same.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A computer-implemented method, comprising:
   receiving, at a first time, via a first computer network, by at least one specifically programmed computer processor of a central data management server, first terminal data from at least one first terminal machine;
   wherein the first terminal data comprises:
      i) at least one first alphanumerical data sequence,
         wherein the at least one first alphanumerical data sequence is a result of at least one first one-way hashing algorithm that the at least one first terminal machine has applied to at least one terminal-generated alphanumerical value which has been generated, at the first time, by the at least one first terminal machine, and
      ii) first game play data of at least one game being played by at least one user,
         wherein the at least one first alphanumerical data sequence is distinct from the first game play data;
   generating, by the at least one specifically programmed computer processor of the central data management server, at least one first computer-generated barcode based, at least in part, on the first terminal data;
   storing, in real-time, by the at least one specifically programmed computer processor of the central data management server, the first terminal data and the at least one first computer-generated barcode in at least one database residing in a non-transient computer memory;
   transmitting, in real-time, by the at least one specifically programmed computer processor of the central data management server, the at least one first computer-generated barcode to the at least one first terminal machine;
   wherein the at least one first terminal machine is configured to generate a user game play output representative of the first game play data at the first time;
   wherein the user game play output comprises:
      i) the at least one first terminal-generated alphanumerical value, and
      ii) the at least one first computer-generated barcode;
   receiving, at a second time, via a second computer network, by the at least one specifically programmed computer processor of the central data management server, second terminal data from at least one second terminal machine;
   wherein the second terminal data comprises:
      i) at least one second alphanumerical data sequence,
      ii) at least one second computer-generated barcode;
   wherein the at least one second alphanumerical data sequence is a result of the at least one one-way hashing algorithm that the at least one second terminal machine has applied to at least one alphanumerical value which has been acquired by the at least one second terminal machine from a user game play input;
   wherein the at least one alphanumerical value has been offered as being the at least one terminal-generated alphanumerical value from the user game play output;
   wherein the at least one second computer-generated barcode has been acquired by the at least one second terminal machine from the user game play input;
   wherein the at least one second computer-generated barcode has been offered as being the at least one first computer-generated barcode from the user game play output;
   validating, in real-time, by the at least one specifically programmed computer processor of the central data management server, the user game play input as being representative of the user game play output by performing one of:
      i) confirming that:
         1) the at least one second alphanumerical data sequence equals to the at least one first alphanumerical data sequence, and
         2) the at least one second computer-generated barcode matches to the at least one first computer-generated barcode; or
      ii) generating a validation error when:
         1) the at least one second alphanumerical data sequence does not equal to the at least one first alphanumerical data sequence, or
         2) the at least one second computer-generated barcode does not match to the at least one first computer-generated barcode; and
   transmitting, in real-time, by the at least one specifically programmed computer processor of the central data management server, a validation notification to the at least one second terminal machine, wherein the validation notification identifies that:
      i) the user game play input has been validated to be representative of the user game play output, or
      ii) the user game play input is not representative of the user game play output.

2. The method of claim 1, wherein the at least one first one-way hashing algorithm is selected from the group consisting of: SHA-224, SHA-256, SHA-384, SHA-512, SHA-512/224, SHA-512/256, RIPEMD-128/256, RIPEMD-320, SHA-3, SHA3-224, SHA3-256, SHA3-384, and SHA3-512.

3. The method of claim 1, wherein the at least one game is a lottery game.

4. The method of claim 1, wherein the at least one computer-generated barcode comprises at least one of:
   i) a predetermine number of alphanumerical characters,
   ii) imagery data that is representative of at least one visual imagery,
   iii) audio data that is representative of at least one audio recording; and iv) any combination thereof.

5. The method of claim 4, wherein the at least one visual imagery is an optical machine-readable representation comprising a plurality of geometric shapes.

6. The method of claim 5, wherein the plurality of geometric shapes comprise a plurality of parallel lines, having varying widths, spacings, or both.

7. The method of claim 1, wherein the game play output is a paper ticket.

8. The method of claim 1, wherein the user game play output is a computer-generated display presentation caused, by the at least one specifically programmed computer processor of the central data management server, to be generated on at least one of:
   i) a screen of the at least one first terminal machine, and
   ii) a screen of at least one computing device which is distinct from the at least one first terminal machine.

9. The method of claim 8, wherein the at least one computing device is a mobile device associated with the at least one user.

10. The method of claim 1, wherein the first computer network and the second computer network are the same.

11. The method of claim 1, wherein the at least one first terminal machine and the at least one second terminal machine are the same.

12. A specifically programmed central data management system, comprising:
   at least one specialized computer machine, comprising:
   a non-transient computer memory, electronically storing particular computer executable program code; and
   at least one computer processor which, when executing the particular program code, becomes a specifically programmed computer processor of the specifically programmed central data management system that is configured to at least perform the following operations:
   receiving, at a first time, via a first computer network, first terminal data from at least one first terminal machine;
   wherein the first terminal data comprises:
      i) at least one first alphanumerical data sequence,
         wherein the at least one first alphanumerical data sequence is a result of at least one one-way hashing algorithm that the at least one first terminal machine has applied to at least one terminal-generated alphanumerical value which has been generated, at the first time, by the at least one first terminal machine, and
      ii) first game play data of at least one game being played by at least one user,
         wherein the at least one first alphanumerical data sequence is distinct from the first game play data;
   generating at least one first computer-generated barcode based, at least in part, on the first terminal data;
   storing, in real-time, the first terminal data and the at least one first computer-generated barcode in at least one database residing in a non-transient computer memory;
   transmitting, in real-time, the at least one first computer-generated barcode to the at least one first terminal machine;
   wherein the at least one first terminal machine is configured to generate a user game play output representative of the first game play data at the first time;
   wherein the user game play output comprises:
      i) the at least one first terminal-generated alphanumerical value, and
      ii) the at least one first computer-generated barcode;
   receiving, at a second time, via a second computer network, second terminal data from at least one second terminal machine;
   wherein the second terminal data comprises:
      i) at least one second alphanumerical data sequence,
      ii) at least one second computer-generated barcode;
      wherein the at least one second alphanumerical data sequence is a result of the at least one one-way hashing algorithm that the at least one second terminal machine has applied to at least one alphanumerical value which has been acquired by the at least one second terminal machine from a user game play input;
      wherein the at least one alphanumerical value has been offered as being the at least one terminal-generated alphanumerical value from the user game play output;
      wherein the at least one second computer-generated barcode has been acquired by the at least one second terminal machine from the user game play input;
      wherein the at least one second computer-generated barcode has been offered as being the at least one first computer-generated barcode from the user game play output;
   validating, in real-time, the user game play input as being representative of the user game play output by performing one of:
      i) confirming that:
         1) the at least one second alphanumerical data sequence equals to the at least one first alphanumerical data sequence, and
         2) the at least one second computer-generated barcode matches to the at least one first computer-generated barcode; or
      ii) generating a validation error when:
         1) the at least one second alphanumerical data sequence does not equal to the at least one first alphanumerical data sequence, or
         2) the at least one second computer-generated barcode does not match to the at least one first computer-generated barcode; and
   transmitting, in real-time, a validation notification to the at least one second terminal machine, wherein the validation notification identifies that:
      i) the user game play input has been validated to be representative of the user game play output, or
      ii) the user game play input is not representative of the user game play output.

13. The system of claim 12, wherein the at least one first one-way hashing algorithm is selected from the group consisting of: SHA-224, SHA-256, SHA-384, SHA-512, SHA-512/224, SHA-512/256, RIPEMD-128/256, RIPEMD-320, SHA-3, SHA3-224, SHA3-256, SHA3-384, and SHA3-512.

14. The system of claim 12, wherein the at least one game is a lottery game.

15. The system of claim 12, wherein the at least one computer-generated barcode comprises at least one of:
   i) a predetermine number of alphanumerical characters,
   ii) imagery data that is representative of at least one visual imagery,
   iii) audio data that is representative of at least one audio recording; and
   iv) any combination thereof.

16. The system of claim 15, wherein the at least one visual imagery is an optical machine-readable representation comprising a plurality of geometric shapes.

17. The system of claim 16, wherein the plurality of geometric shapes comprise a plurality of parallel lines, having varying widths, spacings, or both.

18. The system of claim 12, wherein the game play output is a paper ticket.

19. The system of claim 12, wherein the user game play output is a computer-generated display presentation caused, by the at least one specifically programmed computer processor of the central data management system, to be generated on at least one of:
   i) a screen of the at least one first terminal machine, and
   ii) a screen of at least one computing device which is distinct from the at least one first terminal machine.

20. The system of claim 19, wherein the at least one computing device is a mobile device associated with the at least one user.

21. The system of claim 12, wherein the first computer network and the second computer network are the same.

22. The system of claim 12, wherein the at least one first terminal machine and the at least one second terminal machine are the same.

\* \* \* \* \*